Aug. 31, 1954      H. M. DAVIS      2,687,579
TEACHING MACHINE
Filed Jan. 23, 1952      2 Sheets-Sheet 1
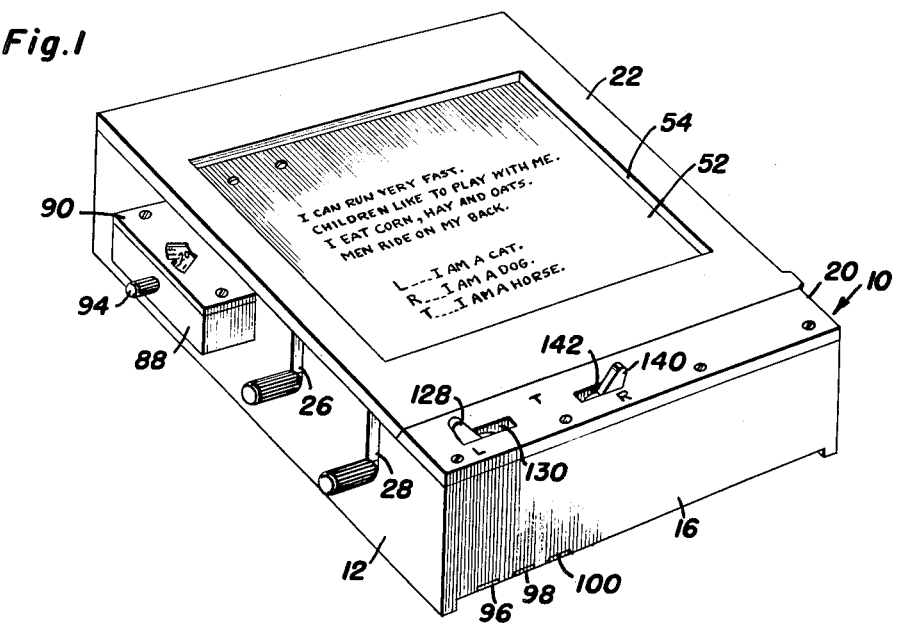
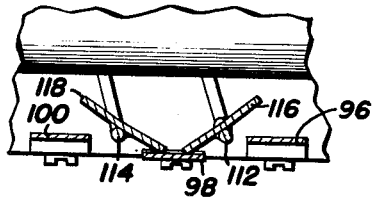
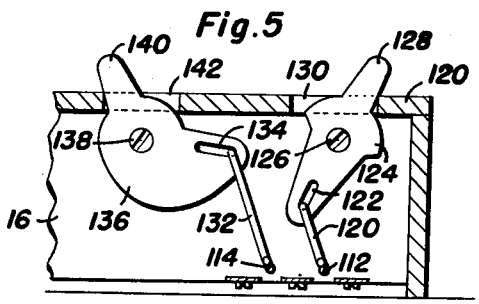
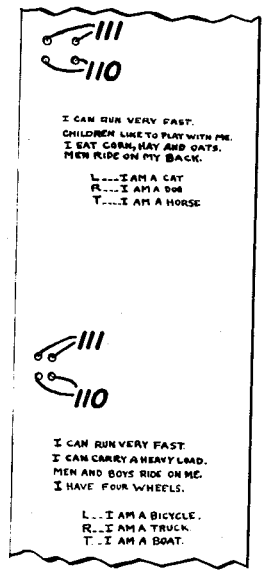
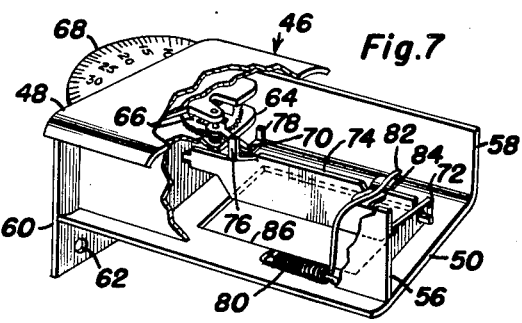
Hollie M. Davis
INVENTOR.

Aug. 31, 1954
H. M. DAVIS
2,687,579
TEACHING MACHINE
Filed Jan. 23, 1952
2 Sheets-Sheet 2
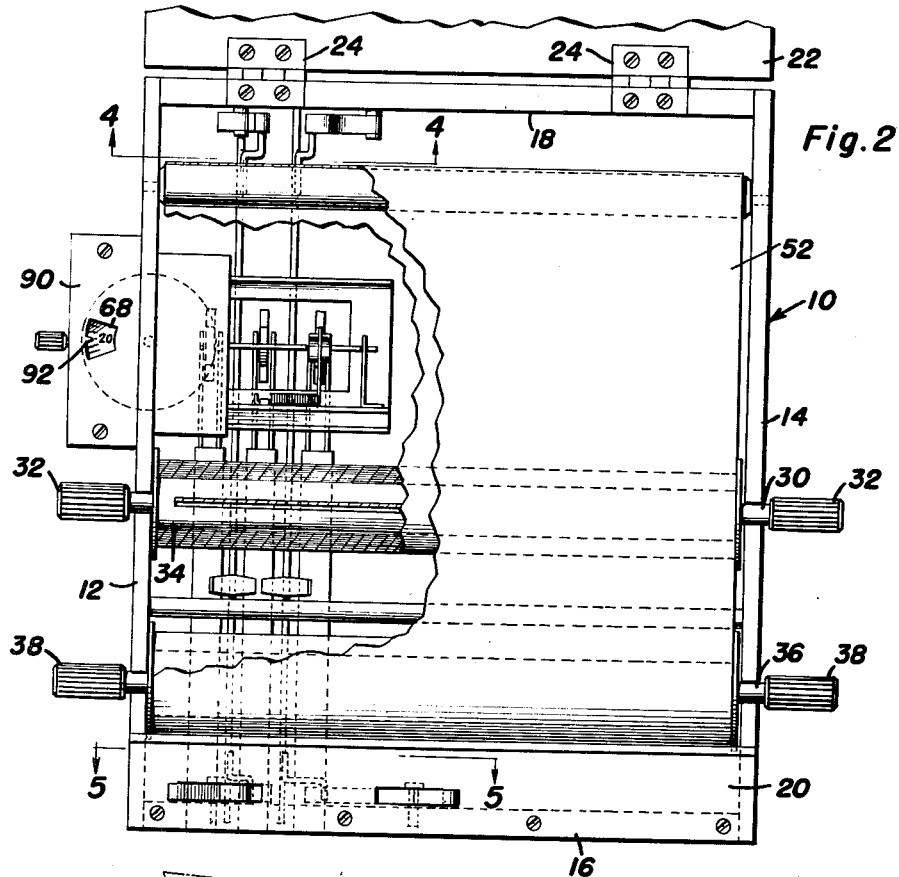
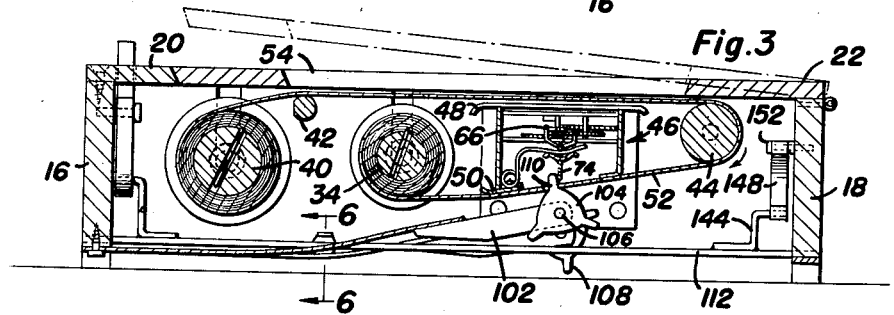
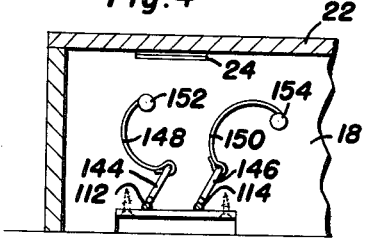
Hollie M. Davis
INVENTOR.
BY *Clarence A. O'Brien*
*and Harvey B. Jacobson*
Attorneys Patented Aug. 31, 1954

2,687,579

UNITED STATES PATENT OFFICE 2,687,579

TEACHING MACHINE

Hollie M. Davis, River Edge, N. J.

Application January 23, 1952, Serial No. 267,755

5 Claims. (Cl. 35—9)

1

This invention relates generally to a teaching machine, and more particularly to a device which not only teaches but also indicates the number of errors.

The primary object of this invention is to provide a teaching machine which provides a plurality of questions and related answers, and means for automatically indicating if an incorrect answer is chosen.

Another object of this invention is to provide a teaching machine which has means for manually selecting the answers to questions provided thereby.

Another object of this invention is to provide a testing machine having means for rotating an indicator dial when an error is made.

A further object of this invention is to provide a teaching machine which has means for manually indicating the chosen answer and linkage connecting the answer indicating means with means for rotating an indicator when the incorrect answer is chosen.

These, together with various ancillary features and objects of the invention, which will later become apparent as the following description proceeds, are attained by the present invention, a preferred embodiment of which has been illustrated, by way of example only, in the accompanying drawings wherein:

Figure 1 is a perspective view of the teaching machine which is the subject of this invention;

Figure 2 is a top plan view of the teaching machine of Figure 1 with its cover open and only partly shown, parts being broken away and shown in section in order to clearly show the mechanism of the machine;

Figure 3 is a vertical central sectional view of the teaching machine of Figure 1 and showing the operating mechanism thereof, the cover being shown in an open position by dotted lines;

Figure 4 is a partial transverse vertical sectional view taken substantially upon the plane indicated by the section line 4—4 of Figure 2 and showing spring means for retaining link elements in their shifted position;

Figure 5 is a partial vertical sectional view taken substantially upon the plane indicated by the section line 5—5 of Figure 2 and showing the construction of indicating levers and their connections to operating linkage;

Figure 6 is a partial transverse vertical sectional view taken substantially upon the plane indicated by the section line 6—6 of Figure 3 and showing the manner in which one of the error indicating levers is moved out of its actuating position;

2

Figure 7 is a perspective view of the error indicating and counting means, parts being broken away and shown in section; and Figure 8 is a partial top plan view of a sheet rotatably mounted in the teaching machine and showing the details thereof.

Referring now more specifically to the accompanying drawings, wherein, like numerals designate similar parts throughout the various views, it will be seen that the embodiment of the invention depicted in the drawings as illustrative of the principles of the invention, comprises a novel teaching machine. Referring more specifically to Figures 1 and 2, it will be seen that the invention comprises a generally rectangular housing 10 which may be formed of wood, metal, plastic or other similar materials. The housing 10 has side walls 12 and 14, end walls 16 and 18, and a partial top wall 20 adjacent the end wall 16. The hinged cover 22 is provided to close the remaining portion of the top of the housing 10. The partial top wall 20 is preferably removably secured in place by conventional fasteners passing through the top wall 20 into the end wall 16. A pair of hinges 24 are secured to the underside of the cover 22 and the upper edge of the end wall 18 by conventional fasteners in order to hingedly connect the cover 22 to the remainder of the housing 10. The machine is illustrated and described as not having any bottom, although it is obvious that a bottom may be added if it is desired.

The side walls of the housing are provided with a pair of elongated slots 26 and 28 which open through the tops of the side walls 12 and 14 and are closed by the cover 22. The slots 26 and 28 have semi-circular bottoms so as to form bearings for shafts. Rotatably journaled in the slots 26 is a transverse shaft 30 which has ends extending exteriorly of the housing 10 and are provided with grip portions 32. Carried by the shaft 30 within the housing 10 is a spool 34 which may be rotated by turning the grips 32.

The slots 28 have rotatably journaled thereon a shaft 36 which extends transversely of the housing 10, and has portions exteriorly thereof on which are secured grips 38. Also mounted on the shaft 36 but carried within the housing 10 is a spool 40.

An idler shaft 42 extends between the side walls 12 and 14 and is rotatably journaled therein. The idler shaft 42 is located intermediate the spools 34 and 40, and is positioned adjacent the upper edges of the side walls 12 and 14.

Extending between and rotatably journaled in the side walls 12 and 14 is a reversing roller 44.

The upper surface of the reversing roller 44 is in the same plane as the upper surface of the idler shaft 42, whereby sheets passing thereover are maintained closely beneath the bottom of the cover 22. The reversing roller 44 is mounted adjacent the end wall 18.

Positioned within the housing 10 is an error indicating and recording mechanism which will be referred to generally by reference numeral 46 and further described hereinafter. The error indicating mechanism 46 has an upper guide member 48 and a lower guide member 50. Referring now to Figure 3, it will be seen that an elongated sheet 52 has a portion reeled around the spool 34 and extends from the spool 34 beneath the lower guide member 50 to the reversing member 44. The sheet 52 passes around the reversing member 44 and over the upper guide member 48 to the idler shaft 42. The sheet then extends from the idler shaft 42 to the spool 40 around which a portion of the sheet is reeled. The cover 22 is provided with a window 54 overlying the portion of the sheet 52 which extends between the idler shaft 42 and the reversing roller 44. It is readily apparent that the sheet 52 may be moved beneath the window 54 and may be selectively moved with respect thereto by rotating the shafts 30 and 36.

Referring now to Figure 7 in particular, it will be seen that the error indicating and recording mechanism 46 has a frame construction with the guide member 48 and lower guide member 50 forming the upper and lower sides thereof respectively. Extending between and secured to the upper guide member 48 and the lower guide member 50 are longitudinally extending side walls 56 and 58. One of the ends of the frame is closed by a mounting bracket 60 which also extends below the frame. The mounting bracket 60 is secured to the side wall 12 by conventional fasteners passing through apertures 62 in the bracket 60.

A supporting flange 64 extends from the bracket 60 and underlies the upper guide member 48 in spaced relation thereto. Mounted on the support flange 64 is a spring urged clock works 66. The clock works 66 includes a rotatable dial 68 and a gear having an arm 70 which is releasably secured against rotation. Although the clock works 66 may be of any desired type, the preferred embodiment is a simple pocket watch having its dial 68 secured to the minute hand shaft, whereby the dial rotates with respect to the gears in lieu of the minute hand. In order that the dial may be moved a predetermined amount to record each error, the second hand wheel has been cut away with the exception of one spoke which now forms the arm 70.

A bracket 72 is carried within the frame of the error indicating mechanism 46 and is mounted on the side wall 56. The bracket 72 is in spaced parallel relation to the mounting bracket 60, and the two brackets have aligned apertures. Extending between the brackets 60 and 72 and rotatably journaled in the apertures therein is a trigger bar 74. The trigger bar 74 is provided on its upper edge with an escapement element which has upstanding arms 76 and 78 for alternately engaging the arm 70 of the clock work 66 and preventing rotation thereof. Secured to the lower guide member 50 is a coil spring 80 having an offset arm 82 engaging a plate 84 secured to the upper edge of the trigger bar 74 for maintaining the trigger bar 74 in a vertical position as shown in Figure 7. An opening 86 is provided in the lower guide member 50 underlying the trigger bar 74.

As will be seen by referring to Figure 7, when force is applied to the trigger bar 74 so that it is rotated counter-clockwise the arm 76 of the escapement is rotated to a position below the arm 70 of the clock works 66. The arm 70 is then free to rotate substantially one revolution until it engages the arm 78 of the escapement. Arm 78 having been rotated upward at the same time that arm 76 rotated downward. When the force acting on the trigger bar is removed the bar is returned to its normal position by the pressure of offset arm 82 on plate 84. As the bar returns to the normal position arm 78 rotates clockwise and releases arm 70. Arm 70 rotates a short distance and is stopped by arm 76, and is again positioned between the arms 76 and 78 of the escapement. When the arm 70 has returned to this position it has completed a complete revolution, and the indicating dial 68 has moved one notch, thereby recording one error.

Referring now to Figures 1 and 2, it will be seen that the error indicating and recording mechanism 46 extends through the side wall 12 of the housing 10, and that the portion externally of the housing 10 is enclosed in a housing 88. The housing 88 is provided with a detachable cover 90 which has an opening therein provided with a pointer 92 for reading the dial 68. The winding stem 94 of the clock works 66 extends through the housing 88 in order that the clock works 66 may be wound.

Secured to the bottom of the end wall 16 are three elongated flat springs 96, 98 and 100. The flat springs 96, 98 and 100 are each provided at their free end with a pair of spaced parallel arms 102 which extends toward the end wall 18 as a continuation of the springs. Mounted between the pairs of arms 102 are cog wheels 104 which are rotatably journaled on pins 106 between the arms 102. The cog wheels 104 are provided with cogs 108 which are adapted to pass through apertures 110 selectively positioned in the sheet 52.

As is shown in Figure 3, when the spool 40 is rotated to reel the sheet 52 thereon, the cogs 108 extending through the apertures 110 are rotated against the underside of the trigger bar 74, and the trigger bar 74 is rotated in a counter-clockwise direction. Counter-clockwise rotation of the trigger bar 74 releases the arms 70 of the clock works 66 in the manner described above. When the dial 68 rotates to indicate an error, the sheet 52 is moved back to its original position by rotating the spool 34 winding the sheet 52 thereon. The cog 108 then engages the opposite side of the trigger bar 74 and rotates it in a clockwise direction. This is not registered on the dial as clockwise rotation of the trigger bar does not cause arm 76 to release arm 70. The apertures 110 and the sheet 52 are so spaced that they are always in alignment with a cog 108.

Extending between the end walls 16 and 18, and rotatably journaled therein are rods 112 and 114. The rod 112 extends intermediate the flat springs 96 and 98 in parallel relation thereto, and has mounted thereon a depresser bar 116. The depresser bar 116 is adapted to be pivoted into engagement with the upper surface of either the spring 96 or the spring 98, in order to move their associate cog wheels 104 to a position below the sheet 52 so that their associated cogs 108 do not extend through the apertures 110 in the sheet 52. Carried by the rod 114 is a depresser bar 118 which is adapted to engage the upper surface of the spring 98 or the upper surface of the spring 100 to move the spring selectively downwardly in order to move their cog wheels 104 from engagement with the sheet 52.

Referring now to Figure 5, it will be seen that the rod 112 is provided with an upwardly extending arm 120 adjacent its point of engagement with the end wall 16. The arm 120 has a portion engaged in an elongated slot 122 of a lever 124. The lever 124 is rotatably mounted on a shaft 126 which is carried by the end wall 16, and is provided at its upper end with a shift arm 128 extending through a slot 130 in the top wall 20. The construction of the lever 124 is such that when the shift arm 128 is moved to the left, the arm 120 is moved to the right to rotate the depresser bar 116 clockwise as shown in Figure 6. The shift arm 128 is shown in Figure 5 as being positioned to the right, and the depresser bar 116 is pivoted counter-clockwise into engagement with the upper surface of the spring 98 so that in turn the cog wheel 104 mounted on the end of the spring 98 is moved out of engagement with the sheet 52.

The rod 114 is provided with an upwardly extending arm 132 which has its upper end engaged in an elongated slot 134 of a lever 136. The lever 136 is rotatably mounted on a shaft 138 carried by the end wall 16, and has at its upper end a shift arm 140 extending through a slot 142 in the top wall 20. The lever 136 functions in the same manner as the lever 124 to rotate the depresser bar 118. The rods 112 and 114 are provided with upwardly extending arms 144 and 146, respectively, adjacent the end wall 18. The arms 144 and 146 are secured to the ends of springs 148 and 150 which are mounted on pins 152 and 154, respectively. The springs 148 and 150 maintain the arms 144 and 146, respectively, in the position to which they are last moved, and thereby retain the depresser bars 116 and 118 in their depressing position. The pins 152 and 154 are carried by the end wall 18.

In view of the foregoing, it will be seen that when the switch arms 128 and 140 are both moved to the right as viewed in Figure 1, that the springs 96 and 98 are depressed and associated cog wheels 104 are moved out of engagement with the sheet 52. This leaves only the cog wheel 104 of the spring 100 for engagement with the trigger bar 74 through the apertures 110 in the sheet 52. It is believed to be obvious that if the sheet 52 were not provided with apertures 110 in alignment with the cog wheel 104 with the spring 100 at a point on the sheet 52, then the trigger bar 74 would not be tripped. It is on this principle that the teaching machine operates. The sheet 52 is provided with printed matter in the form of simple verses describing an object, and three possible answers. For example, the sheet 52 may contain the following verse and possible answers:

I CAN RUN VERY FAST.
CHILDREN LIKE TO PLAY WITH ME.
I EAT CORN, HAY AND OATS.
MEN RIDE ON MY BACK.

L. . . . I AM A CAT
R . . . I AM A DOG
T . . . I AM A HORSE

It is obvious that the above verse describes a horse and that the correct answer is I AM A HORSE.

Since the correct answer is I AM A HORSE, and the correct answer follows the letter T the shift arms 128 and 140 should be moved towards each other. This depresses the springs 96 and 100 and leaves only the cog wheel 104 of the spring 98 in engagement with the underside of the sheet 52. Since this is the correct answer, the sheet 52 is provided at its corresponding portion in alignment with the trigger bar 74 with apertures 110 in alignment with the cog wheels 104 of the springs 96 and 100 only. Since the movement of either the shift arm 128 or the shift arm 140 to any other position, would release either the spring 96 or the spring 100, it is obvious that an incorrect positioning of the shift arms 128 and 140 would result in the cog wheels 104 of either of the spring 96 or the spring 100 engaging the trigger bar 74 and recording an error.

The top wall 20 may be provided with the letters L, T, R adjacent the slots 130 and 142 in order to indicate to the child using the teaching machine which direction to move the shift arms 128 and 140.

In view of the foregoing, it is believed that the operation of the machine is readily apparent. However, the operation of the machine is described herebelow.

The operator of the machine reads the exercise shown through the window 54 of the cover 22 in Figure 1, and if he decides that the correct answer is DOG, he turns the shift arms 128 and 140 to the right. This depresses the springs 96 and 98 and allows the cog wheel 104 of the spring 100 to remain in engagement with the sheet 52. Since this is the wrong answer, the sheet 52 is provided with apertures 110 in alignment with the cogs 108 of the cog wheel, and the cogs 108 pass through the apertures 110 and engage the trigger bar 74.

The operator then rotates the shaft 36 to move the printed matter towards the bottom of the window 54, whereby the cog 108, as shown in Figure 3, is rotated clockwise and pivots the trigger bar 74 so as to move past the trigger bar 74. The pivoting of the trigger bar 74 results in the releasing of the arm 76, and the dial 68 is permitted to rotate one notch to indicate an error.

Being appraised by the dial that he has made a mistake, the operator will return the printed matter to its original position in the window 54 by rotating the shaft 30. As the sheet 52 is moved back to its original position, the cog 108 will trip the trigger arm 74 in an opposite direction, but the arm 70 will not move due to its trapped position between the arms 76 and 78 of the escapement.

If the operator now decides that CAT is the correct answer, the cog wheel 104 on the end of spring 96 is engaged with other apertures 110 in the sheet 52 and likewise trip the trigger bar 74 to record a second error. However, if the operator decides that HORSE is the correct answer, the shift arms 128 and 140 will be moved together and the springs 96 and 100 will be depressed. Since the sheet 52 does not have holes at this point in alignment with the cog wheel 104 of the spring 98, no error will be recorded. The sheet 52 is then reeled onto the spool 40 by rotation of the shaft 36 until the next exercise appears in the window 54. The process is then repeated.

Had the operator, being appraised of one error by a cog passing through one of the holes 110, continued to the next exercise without setting the levers properly, another error would have been automatically recorded by another of the cogs passing through one of the holes 111.

Since the error indicating dial 68 moves one notch on the making of each error, it will be readily seen that the dial shows the total number of errors.

Although the printed matter on the sheet 52 has been illustrated and described as being a verse and a plurality of possible answers, it is obvious that any type of question and answer may be printed on the sheet 52. The questions may include pictures, designs, maps, etc.

While the teaching machine has been described as having three possible answers and three error determining springs, it is obvious that the machine may be provided with more or less.

Since the numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A teaching device comprising a housing, spools rotatably mounted within said housing, an elongated sheet reeled on said spool, printed matter on said sheet including questions and answers, means for indicating an answer, means for determining an error, means for indicating an error, said means for determining an answer including a releasing mechanism on one side of said sheet, means for actuating said releasing mechanism on the opposite side of said sheet, selected holes in said sheet in alignment with portions of said actuating means, portions of said actuating means being adapted to pass through said holes and mechanically actuate said releasing means.

2. A teaching device comprising a housing, spools rotatably mounted within said housing, an elongated sheet reeled on said spool, printed matter on said sheet including questions and answers, means for indicating an answer, means for determining an error, means for indicating an error, said means for determining an answer including a releasing mechanism on one side of said sheet, means for actuating said releasing mechanism on the opposite side of said sheet, selected holes in said sheet in alignment with portions of said actuating means, portions of said actuating means being adapted to pass through said holes and mechanically actuate said releasing means, said means for indicating an answer including levers adapted to be shifted by the operator of the device.

3. A teaching device comprising a housing, spools rotatably mounted within said housing, an elongated sheet reeled on said spool, printed matter on said sheet including questions and answers, means for indicating an answer, means for determining an error, means for indicating an error, said means for determining an answer including a releasing mechanism on one side of said sheet, means for actuating said releasing mechanism on the opposite side of said sheet, selected holes in said sheet in alignment with portions of said actuating means, portions of said actuating means being adapted to pass through said holes and mechanically actuate said releasing means, said releasing means being adapted to release said error indicating means.

4. A teaching device comprising a housing, spools rotatably mounted within said housing, an elongated sheet reeled on said spool, printed matter on said sheet including questions and answers, means for indicating an answer, means for determining an error, means for indicating the error, said error indicating means including a counter having spring rotated gear means in cooperation with said error determining means, whereby when an error is made limited rotation of said gear means is permitted, and an error indicating dial is moved one space with respect to an indicator pointer, said means for determining an answer including a releasing mechanism on one side of said sheet, means for actuating said releasing mechanism on the opposite side of said sheet, selected holes in said sheet in alignment with portions of said actuating means, portions of said actuating means being adapted to pass through said holes and actuating said releasing means.

5. A teaching device comprising a housing, spools rotatably mounted within said housing, an elongated sheet reeled on said spool, printed matter on said sheet including questions and answers, means for indicating an answer, means for determining an error, means for indicating the error, said error indicating means including a counter having spring rotated gear means in cooperation with said error determining means, whereby when an error is made limited rotation of said gear means is permitted, and an error indicating dial is moved one space with respect to an indicator pointer, said means for determining an answer including a releasing mechanism on one side of said sheet, means for actuating said releasing mechanism on the opposite side of said sheet, selected holes in said sheet in alignment with portions of said actuating means, portions of said actuating means being adapted to pass through said holes and actuating said releasing means, actuation of said releasing means permitting said limited rotation of said gear means.

References Cited in the file of this patent

UNITED STATES PATENTS

| Number | Name | Date |
|---|---|---|
| 1,343,875 | Reese | June 15, 1920 |
| 1,540,150 | Walker | June 2, 1925 |
| 1,949,783 | Cleaver | Mar. 6, 1934 |
| 2,030,175 | Fevre | Feb. 11, 1936 |
| 2,062,453 | Hastings | Dec. 1, 1936 |
| 2,213,974 | Baker | Sept. 10, 1940 |
| 2,564,089 | Williams et al. | Aug. 14, 1952 |